(12) United States Patent
Doi

(10) Patent No.: US 12,513,536 B2
(45) Date of Patent: Dec. 30, 2025

(54) COMMUNICATION RELAY APPARATUS AND STORAGE MEDIUM STORING COMPUTER PROGRAM

(71) Applicant: KABUSHIKI KAISHA TOSHIBA, Tokyo (JP)

(72) Inventor: Toshinori Doi, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 362 days.

(21) Appl. No.: 18/153,589

(22) Filed: Jan. 12, 2023

(65) Prior Publication Data

US 2023/0171613 A1 Jun. 1, 2023

Related U.S. Application Data

(63) Continuation of application No. PCT/JP2021/009614, filed on Mar. 10, 2021.

(30) Foreign Application Priority Data

Jul. 14, 2020 (JP) .................................. 2020-120727

(51) Int. Cl.
*H04W 16/26* (2009.01)
*G01S 3/40* (2006.01)
(Continued)

(52) U.S. Cl.
CPC ............... *H04W 16/28* (2013.01); *G01S 3/40* (2013.01); *H04B 7/0617* (2013.01); *H04W 64/00* (2013.01)

(58) Field of Classification Search
CPC ......... H04W 16/28; H04W 64/00; G01S 3/40; H04B 7/0617
See application file for complete search history.

(56) References Cited

U.S. PATENT DOCUMENTS 10,383,153 B2 * 8/2019 Okuyama ......... H04W 74/0833
10,419,083 B2 * 9/2019 Liang ..................... H04B 7/024
(Continued)

FOREIGN PATENT DOCUMENTS

JP 2003283404 A * 10/2003
JP 2017-163501 A 9/2017
(Continued)

OTHER PUBLICATIONS

Japan Patent Office, Office Action in JP App. No. 2020-120727, 4 pages, and machine translation, 4 pages (Jul. 16, 2024).
(Continued)

*Primary Examiner* — Bernarr E Gregory
*Assistant Examiner* — Kimberly Jenkins
(74) *Attorney, Agent, or Firm* — Finnegan, Henderson, Farabow, Garrett & Dunner, LLP

(57) ABSTRACT

A communication relay apparatus of an embodiment includes an antenna, a signal intensity detector, a first search unit, and a second search unit. The antenna forms a beam of radio waves in an arbitrary direction. The signal intensity detector detects an intensity of a signal received by the antenna. The first search unit changes a direction of the beam formed by the antenna within a first range, and detects a direction in which the mobile station is located based on the intensity of the signal detected by the signal intensity detector. The second search unit changes a direction of the beam formed by the antenna within a second range narrower than the first range, and detects a direction in which the mobile station is located based on the intensity of the signal detected by the signal intensity detector.

4 Claims, 13 Drawing Sheets

(51) Int. Cl.
*H04B 7/026* (2017.01)
*H04B 7/0413* (2017.01)
*H04B 7/06* (2006.01)
*H04B 7/08* (2006.01)
*H04W 16/28* (2009.01)
*H04W 64/00* (2009.01)

(56) References Cited

U.S. PATENT DOCUMENTS

| | | |
|---|---|---|
| 10,848,214 B2 | 11/2020 | Kakishima et al. |
| 11,863,359 B1 * | 1/2024 | Arool Emmanuel ........................ H04L 27/2627 |
| 11,916,623 B2 * | 2/2024 | Frenger ................. H04L 5/0048 |
| 2011/0201368 A1 * | 8/2011 | Faccin ................... H04B 7/022 455/507 |
| 2012/0195264 A1 * | 8/2012 | Taoka ................. H04B 7/0652 455/562.1 |
| 2018/0332623 A1 | 11/2018 | Okuyama et al. |
| 2019/0074876 A1 | 3/2019 | Kakishima et al. |
| 2023/0318732 A1 * | 10/2023 | Sasaki .................... H04B 7/185 398/44 |

FOREIGN PATENT DOCUMENTS

| | | |
|---|---|---|
| JP | 2019-519956 A | 7/2019 |
| JP | 6567438 B2 | 8/2019 |

OTHER PUBLICATIONS

Japan Patent Office, International Search Report in PCT/JP2021/009614, 2 pages (Jun. 1, 2021).

* cited by examiner

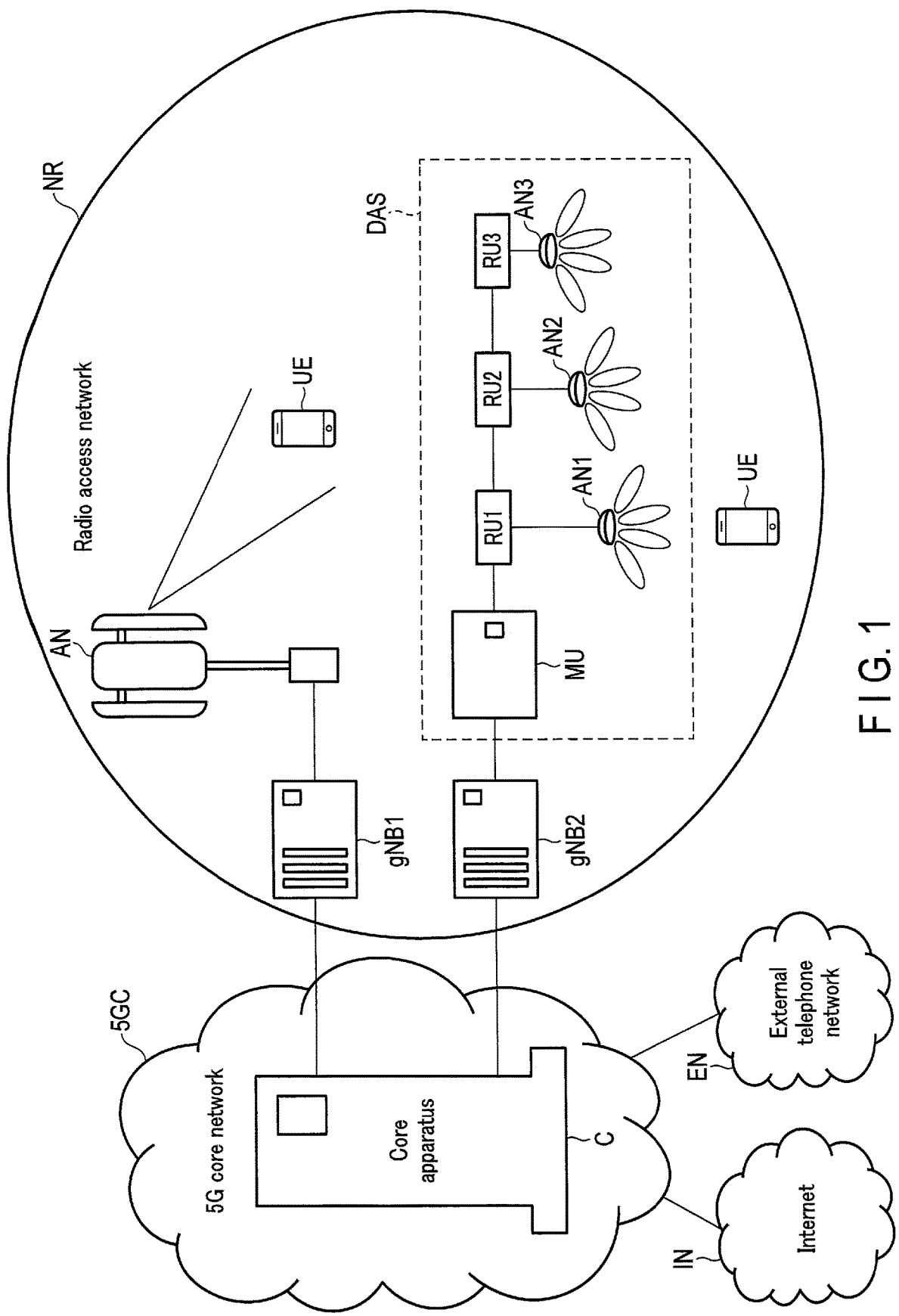
F I G. 1

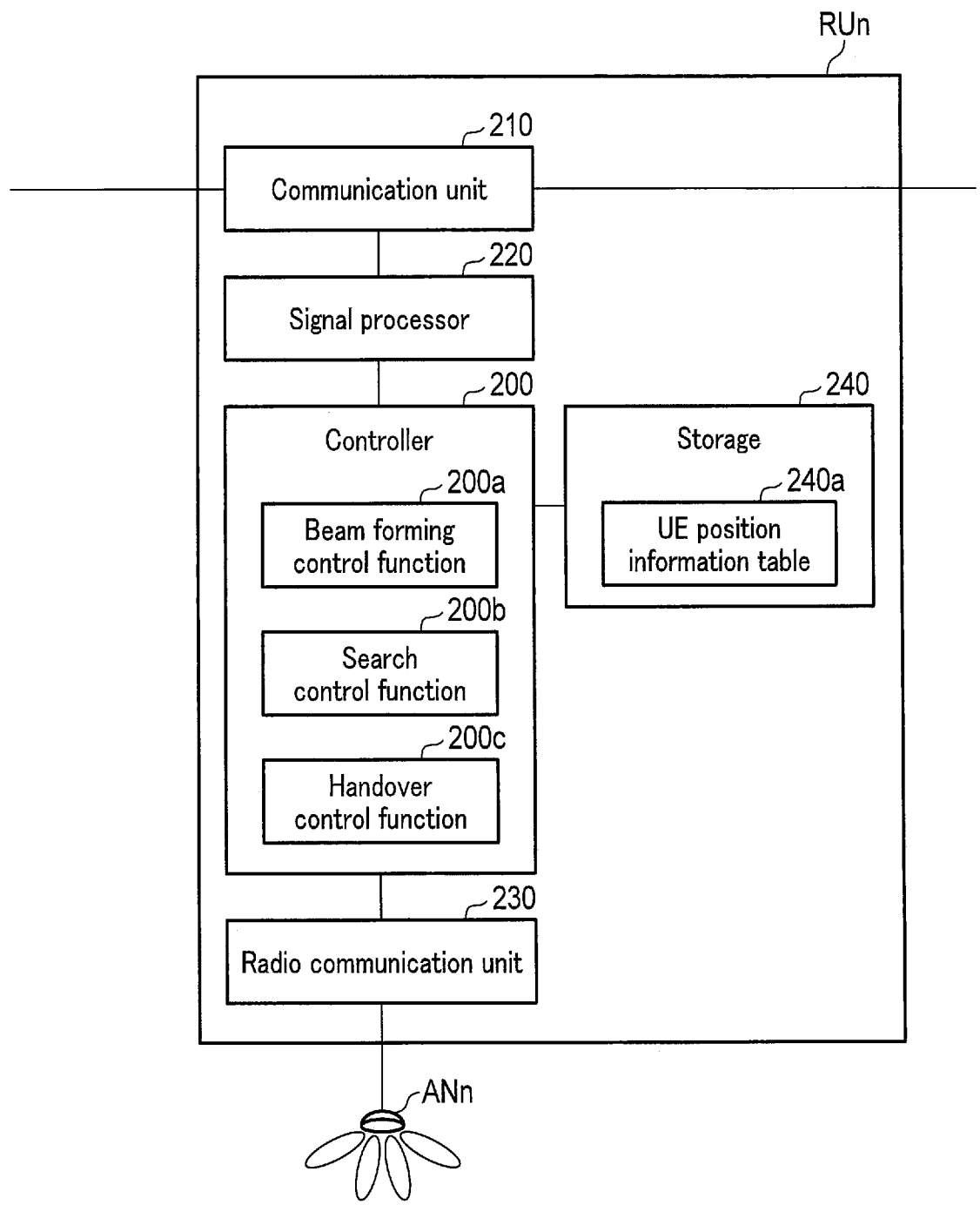
F I G. 3

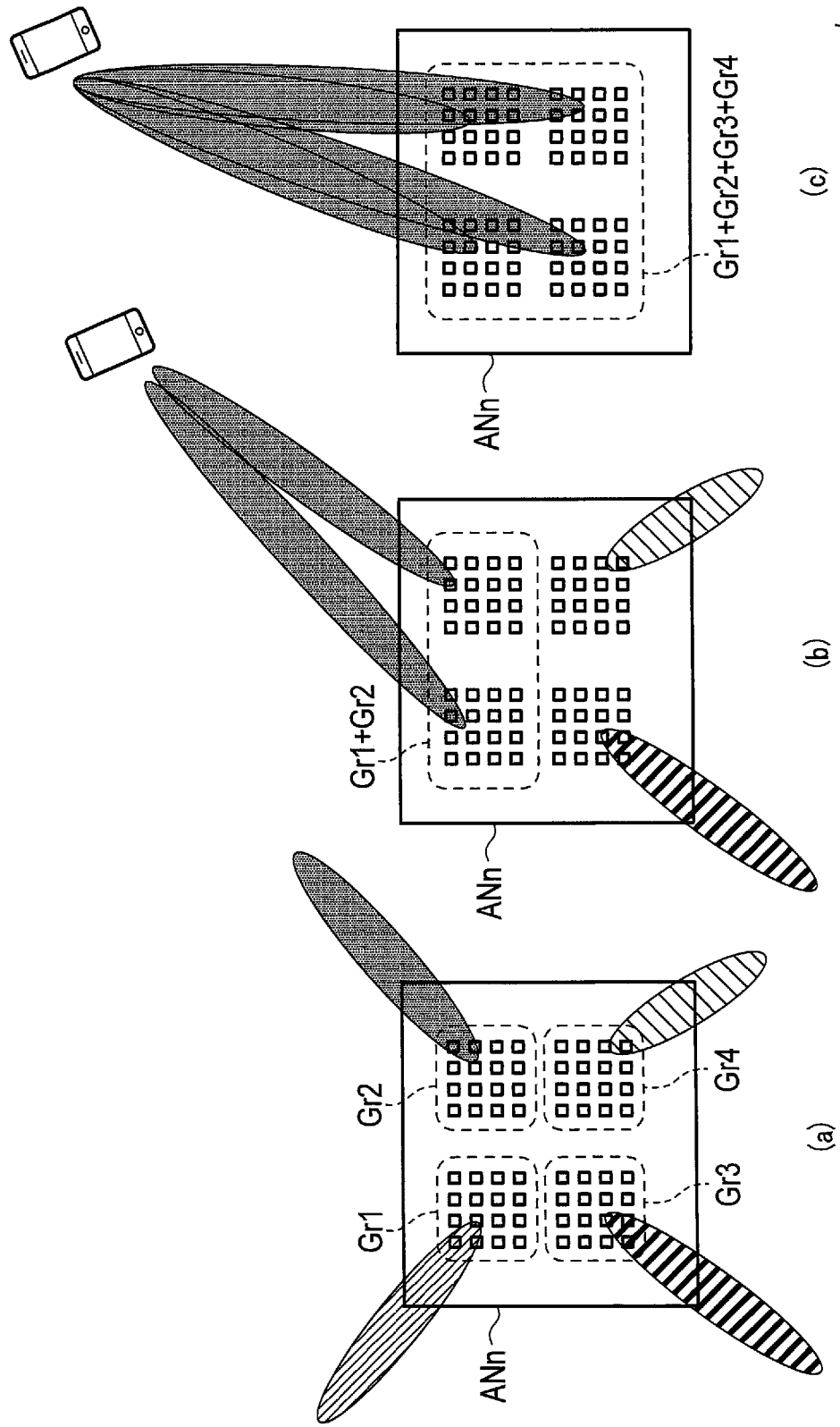
F I G. 4

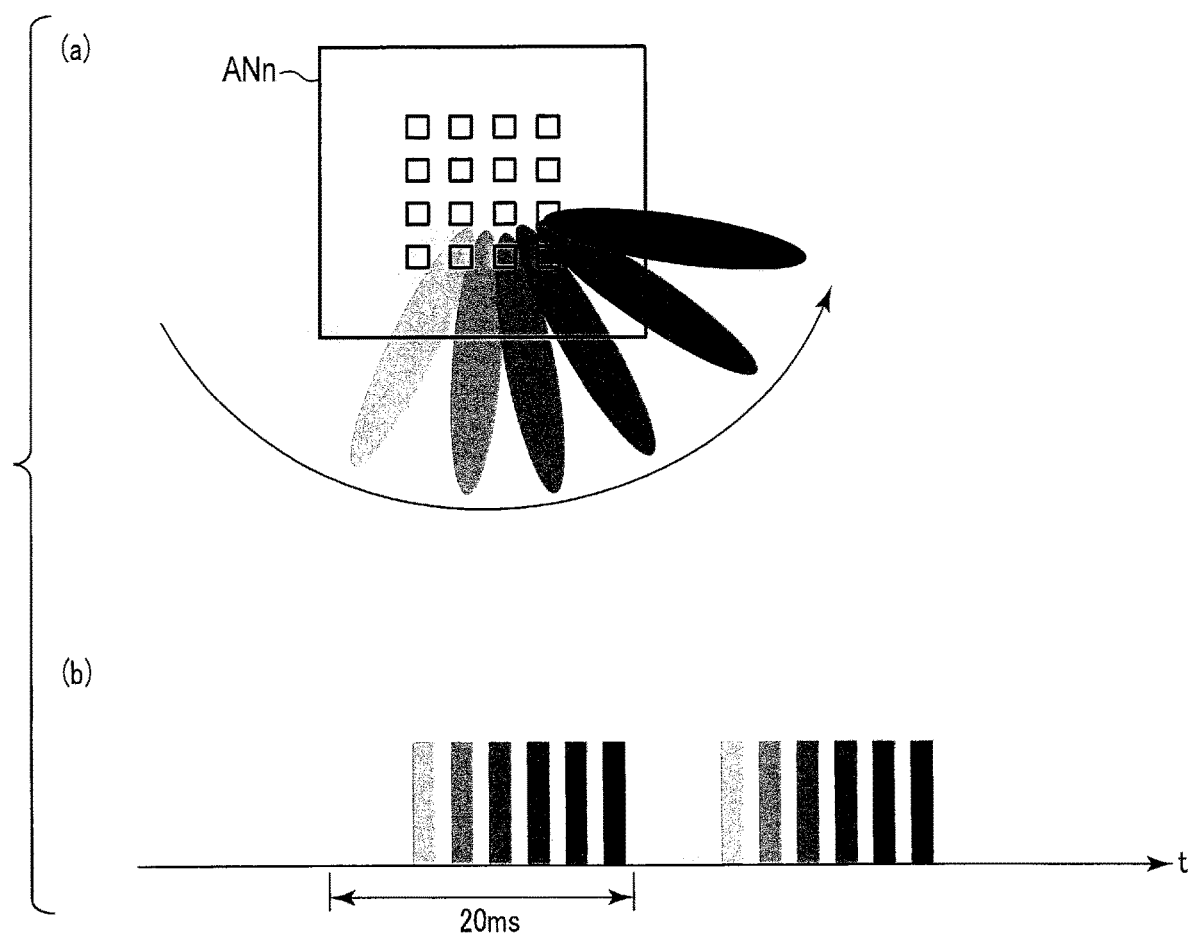
F I G. 5

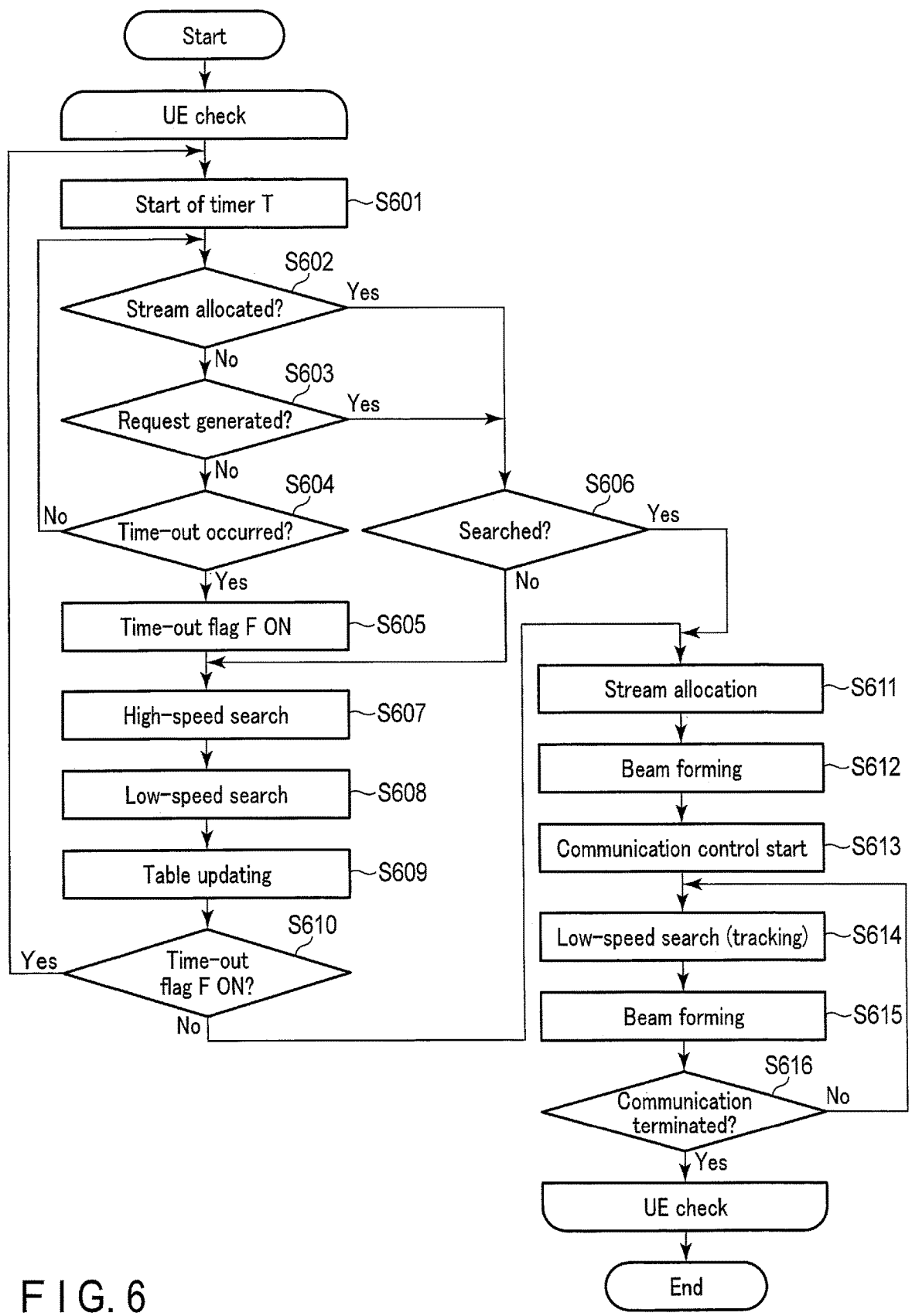
F I G. 6

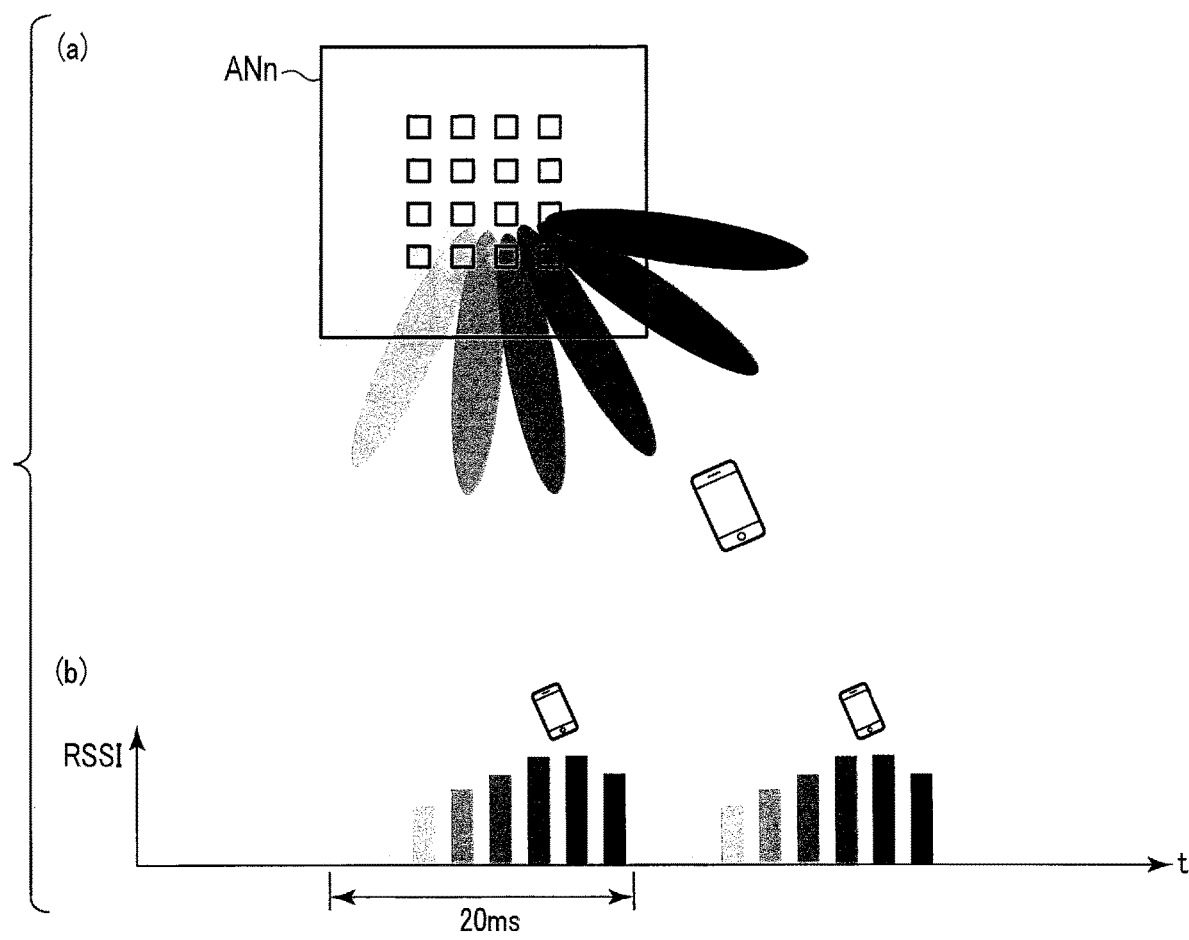
F I G. 7

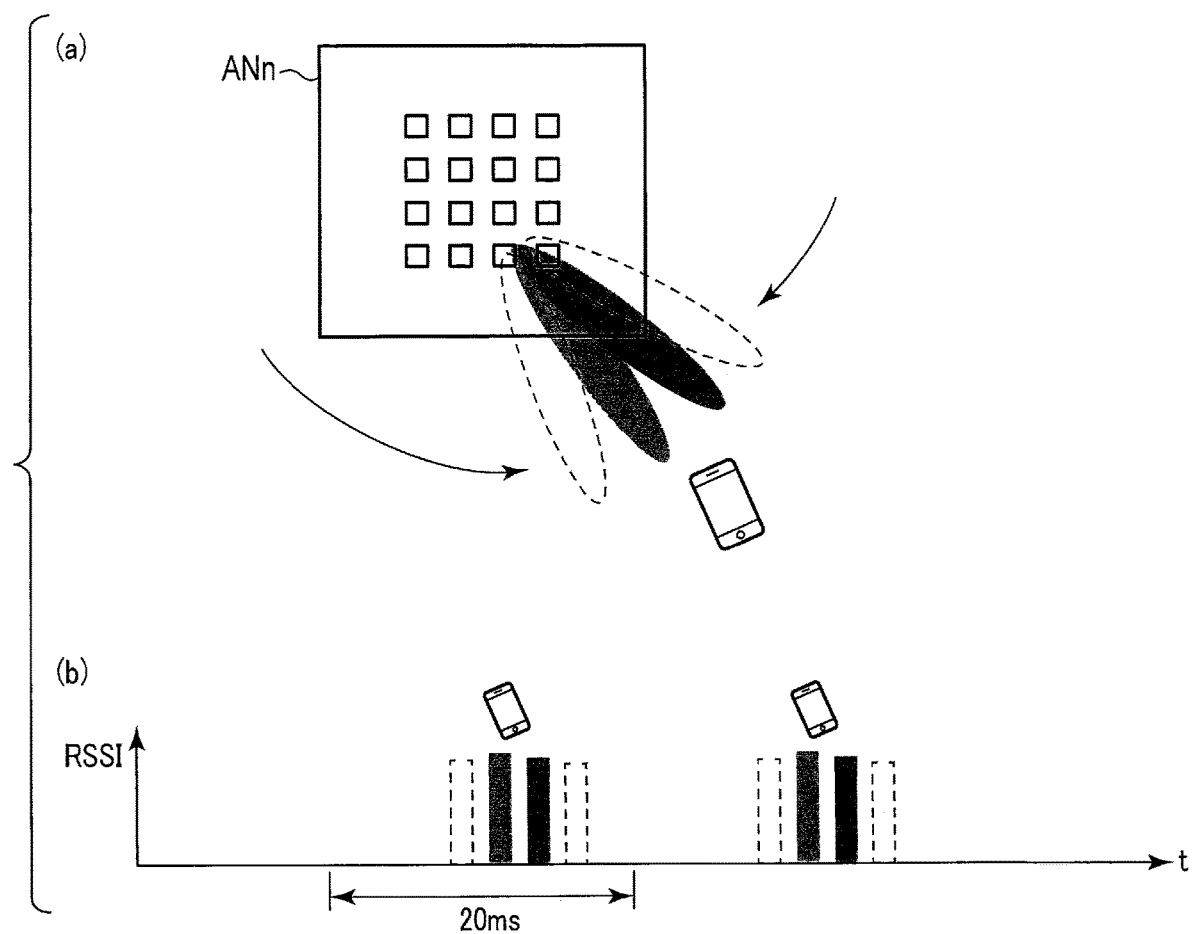
F I G. 9

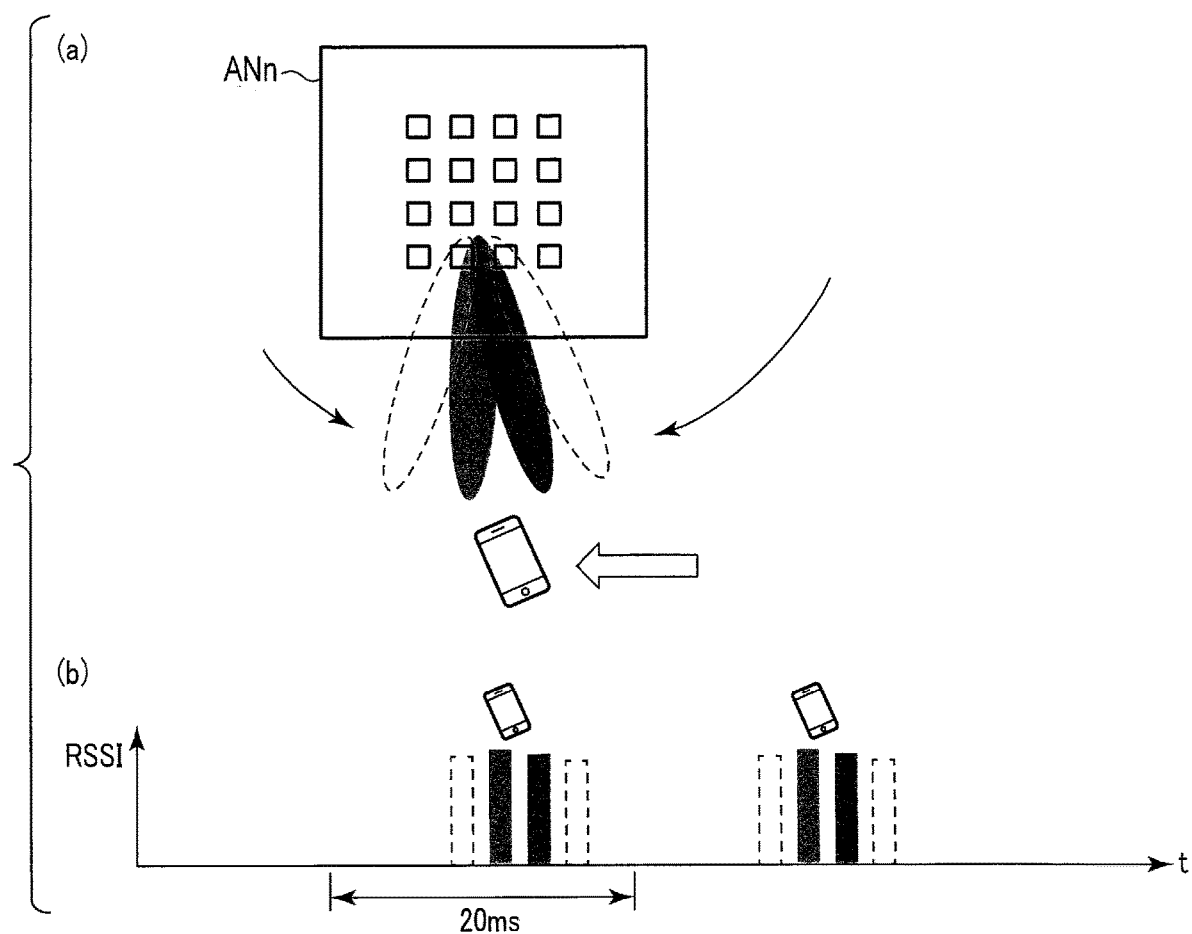
F I G. 10

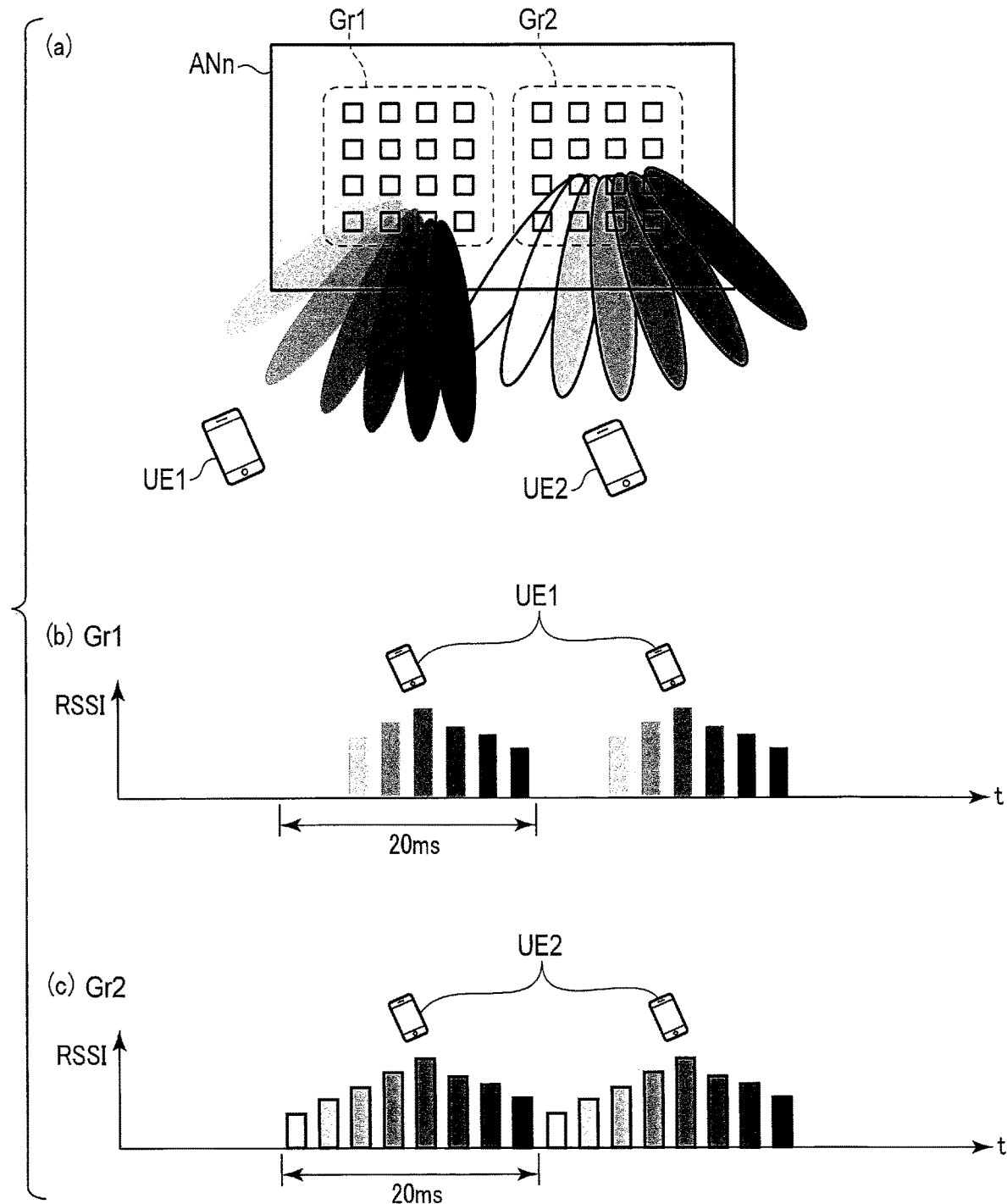
F I G. 11

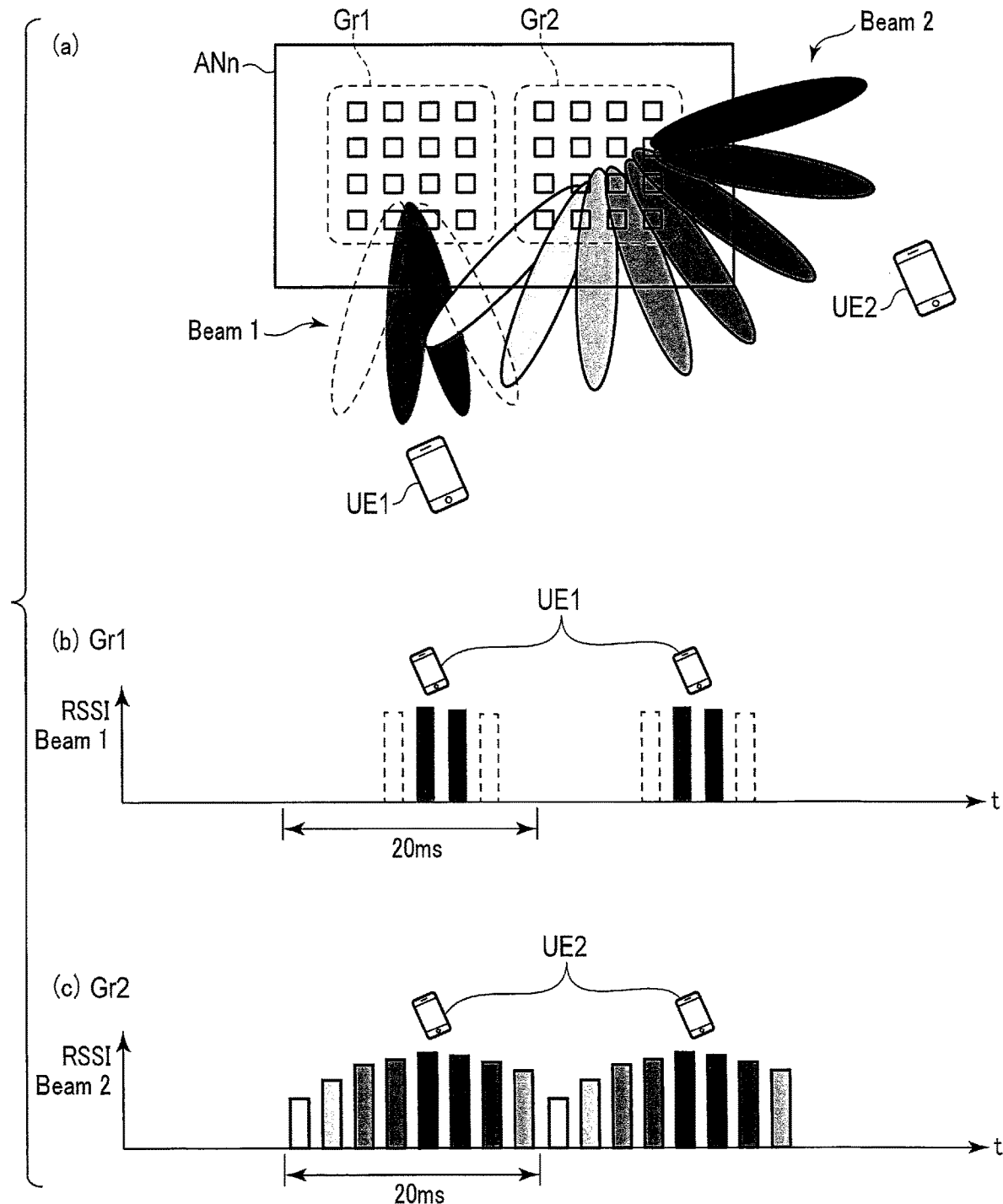
F I G. 12

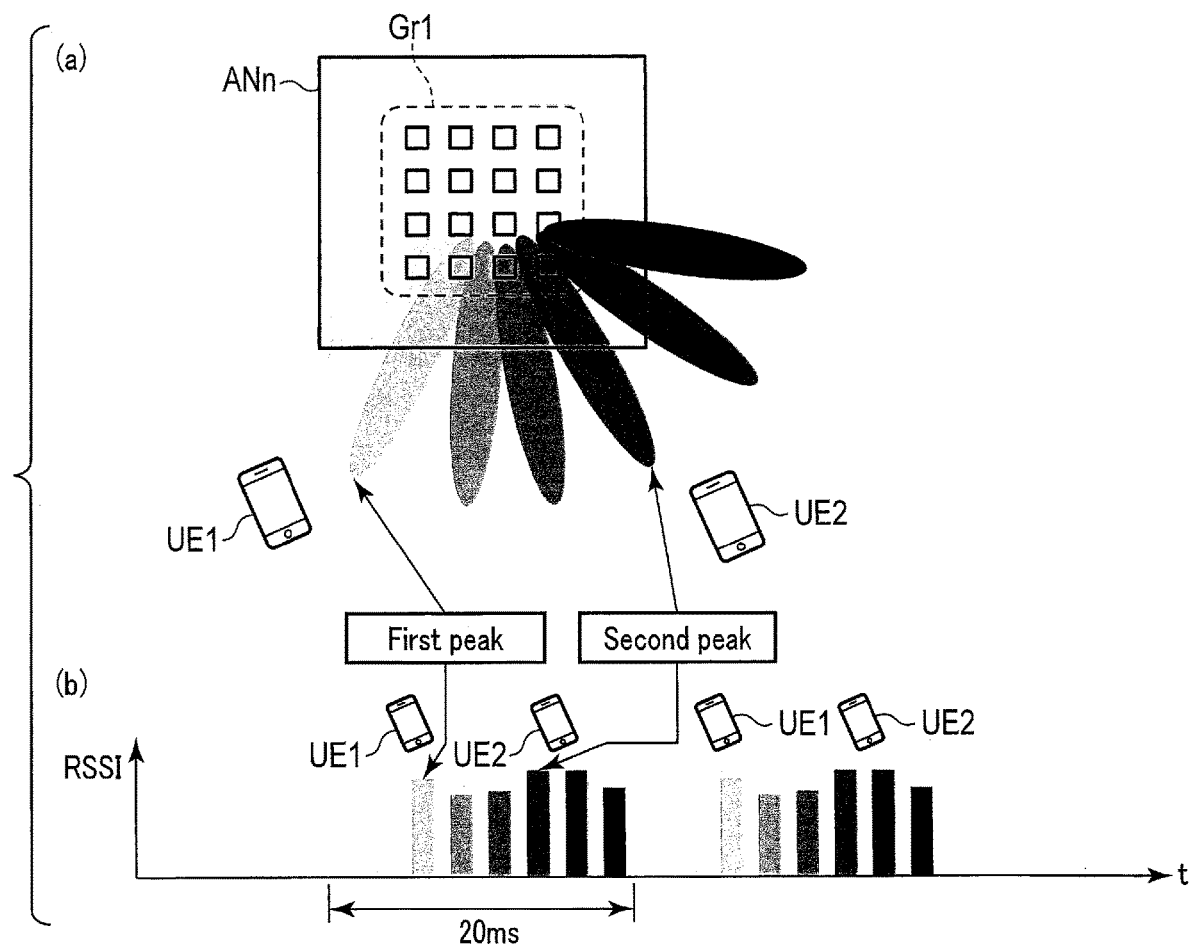
F I G. 13

COMMUNICATION RELAY APPARATUS AND STORAGE MEDIUM STORING COMPUTER PROGRAM

This application is a Continuation Application of PCT Application No. PCT/JP2021/009614, filed Mar. 10, 2021 and based upon and claiming the benefit of priority from Japanese Patent Application No. 2020-120727, filed Jul. 14, 2020, the entire contents of all of which are incorporated herein by reference.

FIELD

Embodiments described herein relate generally to a communication relay apparatus and a storage medium storing a computer program.

BACKGROUND

Beam forming is one of the technologies attracting attention in 5G (fifth generation mobile communication system). This is a function of cooperatively operating a plurality of antenna elements on one antenna and forming a beam of a radio wave in a discretionary direction, thereby realizing an increase in cover area or an increase in cell capacity by simultaneous communication with a plurality of users. Generally, the function is realized by combination with a massive multi-element antenna (Massive MIMO).

Incidentally, before 5G, a distributed antenna system (DAS system) was used as a measure for an indoor cover area of a mobile communication system. The DAS system relays communications between a mobile station and a base station, and includes a master unit and a plurality of remote units arranged in a distributed manner. The master unit distributes a signal of one base station to a plurality of remote units, and the remote units output the same downlink signal from the respective antennas, thereby constructing an area as one cell.

Demand for the DAS system has further increased along with the spread of the 5G system, and a further increase in demand for stability and improvement of communication quality is expected.

BRIEF DESCRIPTION OF THE DRAWINGS

FIG. 1 is a diagram showing a mobile communication system including a communication relay system.

FIG. 3 is a diagram showing a configuration example of a remote unit shown in FIG. 1.

FIG. 4 is a diagram showing an example of beam forming by a remote unit shown in FIG. 1.

FIG. 5 is a diagram showing an example of a search for a mobile station by a remote unit shown in FIG. 1.

FIG. 6 is a flowchart for explaining processing of the master unit shown in FIG. 1.

FIG. 7 is a diagram showing an example of a high-speed search for the mobile station by a remote unit shown in FIG. 1.

FIG. 9 is a diagram showing an example of a tracking search of the mobile station by a remote unit shown in FIG. 1.

FIG. 10 is a diagram showing an example of a tracking search of the mobile station by a remote unit shown in FIG. 1.

FIG. 11 is a diagram showing an example of a search for a mobile station by a remote unit shown in FIG. 1.

FIG. 12 is a diagram showing an example of a search for a mobile station by a remote unit shown in FIG. 1.

FIG. 13 is a diagram showing an example of a search for a mobile station by a remote unit shown in FIG. 1.

DETAILED DESCRIPTION

Figure 2:
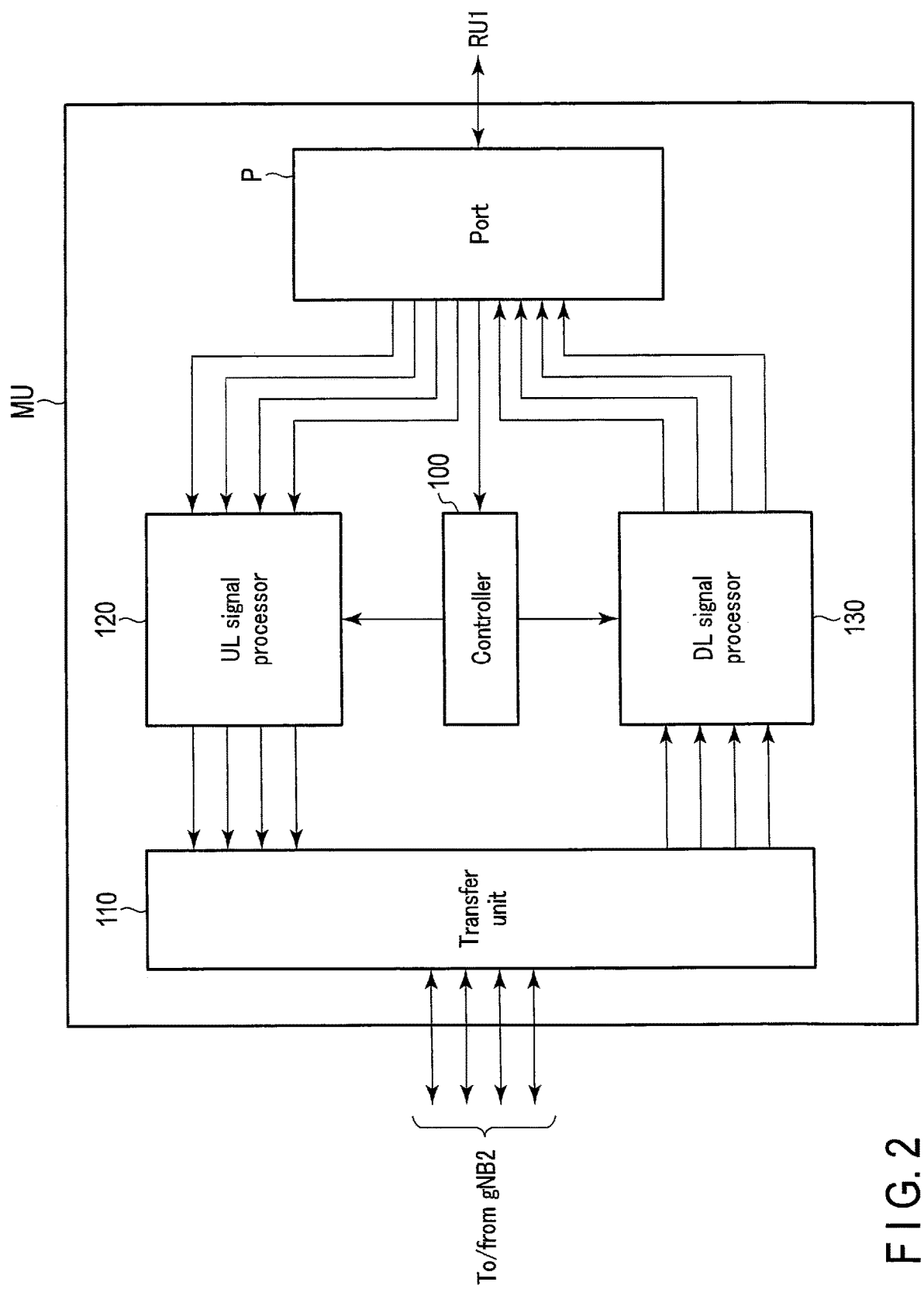
FIG. 2 is a diagram showing a configuration example of a master unit shown in FIG. 1.

The communication relay apparatus of an embodiment includes an antenna, a signal intensity detector, a first search unit, and a second search unit. The antenna forms a beam of radio waves in an arbitrary direction. The signal intensity detector detects an intensity of a signal received by the antenna. The first search unit changes a direction of the beam formed by the antenna within a first range, and detects a direction in which the mobile station is located based on the intensity of the signal detected by the signal intensity detector. The second search unit changes a direction of the beam formed by the antenna within a second range that includes the direction detected by the first search unit and is narrower than the first range, and detects a direction in which the mobile station is located based on the intensity of the signal detected by the signal intensity detector.

Hereinafter, a communication relay system according to an embodiment will be described with reference to the drawings.

FIG. 1 shows a part of a fifth generation mobile communication system, so-called 5G. The mobile communication system includes a 5th generation core network (5G core network) 5GC and a radio access network NR (New Radio). In the example of FIG. 1, the radio access network NR includes a communication relay system.

The 5G core network 5GC controls the radio access network NR, collects traffic, performs communication between the collected traffic and an external network (the Internet IN, an external telephone network EN, or the like), and includes a core apparatus C as its center. The core apparatus C performs, for example, authentication/security management, session management, policy control, packet transfer, and the like.

On the other hand, the radio access network NR includes a plurality of base station apparatuses (for example, gNodeB (gNB)1 and gNB2 in FIG. 1). The base station apparatuses gNB1 and gNB2 are controlled by the core apparatus C, and each forms a radio communication area (a so-called cell) capable of communicating with mobile station user equipment (UE).

To be more specific, the base station apparatus gNB1 wirelessly communicates with the mobile station UE through an antenna apparatus AN provided on a roof of a building or a dedicated tower, and connects the mobile station UE to the 5G core network 5GC through the core apparatus C. In addition, the base station apparatus gNB1 performs beam forming by a massive MIMO which controls phases of signals in a large number of antenna elements on the antenna apparatus AN, and contributes to an increase in communication volume and the like.

The base station apparatus gNB2 has the same function as that of the base station apparatus gNB1, but wirelessly communicates with the mobile station UE through the distributed antenna system DAS instead of the antenna apparatus AN, and connects the mobile station UE to the 5G core network NW through the core apparatus C.

The distributed antenna system DAS is an example of the communication relay system, and is used in a special place to form a relatively small-scale radio communication area compared to that of the antenna apparatus AN (for example, an inside of a building, an underground mall, or other structures, a sparsely or densely populated area, an area in which tower construction is difficult or limited, and a site such as an event hall where the antenna apparatus AN is not permanently placed). As illustrated in FIG. 1, the distributed antenna system DAS includes a master unit MU, remote units RU1 to RU3, and antennas AN1 to AN3.

The master unit MU collectively controls each portion of the distributed antenna system DAS, and serves as a communication relay apparatus that enables the mobile station UE connected via the antennas (AN1 to AN3) and the remote units (RU1 to RU3) to communicate with the base station apparatus gNB2. In a case where the master unit MU is connected to the remote units RU1 to RU3 through an optical communication line, the master unit MU may be generally referred to as an optical repeater.

The antennas AN1 to AN3 are respectively connected to the corresponding remote units RU1 to RU3 in a one-to-one correspondence, each antenna being formed of a large number of antenna elements, and support a massive MIMO in which directivity is controlled (beam forming is performed) by adjusting phases of transmission RF signals and/or reception RF signals.

In this embodiment, in order to simplify the description, it is assumed that each of the antennas AN1 to AN3 perform beam forming to form a maximum of four beams at a time in arbitrary directions. Further, in order to simplify the description, it is assumed that the master unit MU, which will be described in detail later, processes (relays) a maximum of four streams corresponding to the four beams at a time.

In an actual apparatus, the maximum number is not limited to four, and may be three or less, or five or more. In addition, the number of beams formed by each of the antennas AN1 to AN3 is not fixed, and may be dynamically changed by, for example, changing the number of antenna elements to be used.

The remote units RU1 to RU3 are respectively connected to the corresponding antennas AN1 to AN3 in a one-to-one correspondence, and can be connected so as to be able to communicate with the master unit MU via an optical communication line. As a connection method, in addition to a method in which the remote units RU1 to RU3 are connected to the master unit MU by a daisy chain system as illustrated in FIG. 1, a method (not shown) in which each of the remote units RU1 to RU3 is directly connected to the master unit MU is also considered.

In addition, the remote units RU1 to RU3 can perform beam forming by phase adjustment on the corresponding antennas AN1 to AN3, respectively, can also detect (search for) a direction in which the mobile station UE is located by measurement of reception intensity and beam forming, and can perform communication by following the mobile station UE which is moving.

More specifically, regarding beam forming for the uplink, the remote units RU1 to RU3 perform phase adjustment (beam forming) on RF signals obtained by the corresponding antennas AN1 to AN3, respectively. In this example, reception RF signals corresponding to four beams at a maximum are obtained from each of the antennas AN1 to AN3.

The remote units RU1 to RU3 down-convert the reception RF signals corresponding to the respective beams and simultaneously demodulate the reception RF signals into four reception signals respectively corresponding to four beams at the maximum. The remote units RU1 to RU3 serially bundle the respective demodulated reception signals, convert the reception signals from electrical signals into optical signals (modulate optical carriers), and transfer the optical signals to the master unit MU through the optical communication line. A stream included in the reception signal is referred to as a UL stream signal.

On the other hand, regarding the downlink, the remote units RU1 to RU3 convert optical signals transferred from the master unit MU through the optical communication line into electrical signals, and simultaneously demodulate the electrical signals into signals (hereinafter, referred to as DL stream signals) respectively corresponding to four streams at the maximum.

Then, the remote units RU1 to RU3 generate transmission RF signals obtained by modulating carriers using the DL stream signals, and output the transmission RF signals respectively to the antennas AN1 to AN3 connected thereto, to radiate the transmission RF signals into a space. Note that each of the remote units RU1 to RU3 can perform beam forming to simultaneously form four beams at a maximum, and each forms a beam for each DL stream signal to perform transmission. That is, in a case where four DL stream signals are obtained by demodulation, four beams are formed and each beam transmits one DL stream signal.

Next, the master unit MU will be described in detail. FIG. 2 shows a configuration example of the master unit MU. That is, the master unit MU includes a port P, a controller 100, a transfer unit 110, an uplink (UL) signal processor 120, and a downlink (DL) signal processor 130.

The port P accommodates an optical communication line, can be connected to the remote units RU1 to RU3 via the optical communication line, and is connected to the UL signal processor 120 and the DL signal processor 130. In the example of FIG. 2, it is the remote unit RU1 that is physically directly connected to the optical communication line; however, since optical signals exchanged with the remote units RU2 and RU3 are also multiplexed in the optical communication line, the port P is substantially connected to the remote units RU2 and RU3, and can transmit and receive optical signals to and from any of the remote units RU1 to RU3.

For the uplink, the port P demultiplexes an optical signal transmitted from the remote unit RU1 into a plurality of optical signals, converts each optical signal into an electrical signal, and demodulates the electrical signal to obtain a plurality of electrical communication signals. The plurality of electrical communication signals are reception signals corresponding to the respective beams (or UL stream signals) of the remote units RU1 to RU3, and are output to the UL signal processor 120 in parallel.

The port P functions as an information detector that acquires, from the reception signals, information transmitted from the remote units RU1 to RU3, monitors the demodulated reception signals, and detects a communication start request (PRACH) from the mobile station UE included in the reception signals and stream IDs allocated to the reception signals (UL stream signals). Further, the port P functions as a position detector, and detects a presence of the mobile station UE located in a cover area formed by each of the remote units RU1 to RU3 from results of the aforementioned detection or the like. These detection results are reported to the controller 100.

On the other hand, for the downlink, four DL stream signals at a maximum are simultaneously input from the DL signal processor 130 to the port P1. Then, the port P adds, to the input DL stream signals, identification information of the remote units RU1 to RU3 which are destinations, converts the DL stream signals from an electrical signal to an optical signal (modulates optical carriers), multiplexes these optical signals, and transfers the multiplexed optical signals to the remote units RU1 to RU3 through the optical communication line.

The transfer unit 110 accommodates a communication line connected to the base station apparatus gNB2 and communicates with the base station apparatus gNB2 through the communication line. To be more specific, for the uplink, the transfer unit 110 transfers UL signals (four signals at a maximum at a time) input from the UL signal processor 120 to the base station apparatus gNB2. On the other hand, for the downlink, the transfer unit 110 receives DL stream signals (four signals at a maximum at a time) transferred from the base station apparatus gNB2 through the communication line, and outputs the DL stream signals to the DL signal processor 130.

Under the control of the controller 100, the UL signal processor 120 performs a signal addition process of adding the reception signals of the respective beams input from the port P, and outputs the resultant signal as a UL signal to the transfer unit 110.

Under the control of the controller 100, the DL signal processor 130 performs a multiplexing process of multiplexing the DL stream signals input from the transfer unit 110 and outputting the resultant signal to the port P.

The controller 100 is a control center that collectively controls each portion of the master unit MU. The controller 100 includes a memory (not shown) that stores a control program and control data, and a processor (not shown) that executes processing based on the control program and the control data, thereby realizing various control functions. Note that the control program may be provided by a storage medium other than the memory.

As a specific control, the controller 100 performs communication relay control between the mobile station UE and the base station apparatus gNB2 through the remote units RU1 to RU3. In addition, the controller 100 performs stream allocation control or handover control on the remote units RU1 to RU3 based on a detection result notified from the port P, a DL stream signal transferred from the base station apparatus gNB2, or the like.

In the stream allocation control, the controller 100 stores and manages (updates) remote unit information including the capability (the number of streams that can be supported) of the remote units RU1 to RU3, the number of streams allocated at the present time, and the like, and mobile station information including location information of the mobile station UE, and allocates streams to the remote units RU1 to RU3 on the basis of the remote unit information and the mobile station information.

In the handover control, the controller 100 determines whether or not it is necessary to change the remote units RU1 to RU3 to communicate with the mobile station UE on the basis of the detection result notified from the port P, and performs an instruction for a handover between the remote units on each of the remote units RU1 to RU3 and the mobile station UE on the basis of the determination result.

To be more specific, in the handover control, for example, signal intensities of reception signals of the mobile station UE notified from the remote units RU1 to RU3 are compared, and in a case where a signal intensity notified from a remote unit in communication is lower than a preset first threshold value and a signal intensity of the same mobile station UE notified from another remote unit is higher than a second threshold value, both remote units are instructed to perform a handover to the other remote unit. Determination conditions of the necessity of the handover are not limited to this example, and various conditions may be considered according to an installation environment or the like, and may be applied.

Next, the remote units RU1 to RU3 will be described in detail. In the following description, in order to avoid redundancy in the description and confusion about the correspondence relationship of the configurations, the term "remote unit RUn" will be used. The description of "remote unit RUn" is common to all of the remote units RU1 to RU3. That is, in the following description, "n" can be read as any one of 1 to 3.

FIG. 3 illustrates a configuration example of the remote unit RUn (RU1 to RU3). That is, the remote unit RUn includes a controller 200, a communication unit 210, a signal processor 220, a radio communication unit 230, a storage 240, and an antenna ANn.

The communication unit 210 transmits and receives optical communication signals through optical communication lines. The communication unit 210 has at least two accommodation ports, and has a function as an optical communication relay for amplifying an optical communication signal received through an optical communication line accommodated in one port and transmitting the optical communication signal through an optical communication line accommodated in the other port, and a function as a modulator/demodulator for mutually converting between an optical signal and an electrical signal.

As the modulator/demodulator, the communication unit 210 has an optical-to-electrical conversion function of receiving an optical signal through the optical communication line and performing optical-to-electrical conversion to obtain an electrical communication signal (DL stream signal), and an electrical-to-optical conversion function of performing electrical-to-optical conversion of an electrical communication signal (UL stream signal) input from the signal processor 220 to be described later into an optical communication signal and transmitting the optical communication signal through the optical communication line.

The signal processor 220 communicates with the base station apparatus gNB2 in accordance with a predetermined communication protocol. In the downlink direction of the system, the signal processor 220 demodulates and decodes a communication signal obtained by the communication unit 210 to detect a DL stream signal addressed to the remote unit RUn, and outputs the DL stream signal to the controller 200. On the other hand, in the uplink direction of the system, the signal processor 220 generates a UL stream signal using a signal addressed to the base station apparatus gNB2 provided from the controller 200 for modulation of carriers, and outputs the generated signal to the communication unit 210.

The radio communication unit 230 performs radio communication with the mobile station UE through the antenna ANn, and employs a scheme compliant with 5G as a radio access scheme. Therefore, even in a case where the mobile station UE performs communication through the distributed antenna system DAS, the mobile station UE can perform radio communication by the same radio access scheme as that in the case of performing communication with the base station apparatus gNB1 through the antenna AN shown in FIG. 1.

Further, the radio communication unit 230 performs beam forming by a massive MIMO for controlling the phases of signals (transmission RF signals and/or reception RF signals) in a large number of antenna elements on the antenna ANn in accordance with instructions from the controller 200.

The radio communication unit 230 measures the reception signal intensity (for example, RSSI) from the mobile station UE and notifies the controller 200 of the measurement result in association with identification information of the mobile station UE.

The controller 200 is a control center that collectively controls each portion of the remote unit RUn. The controller 200 includes a work memory (not shown) and a processor (not shown) that executes processing based on a control program, control data, and the like read from a storage 240, which will be described later, into the work memory, thereby realizing various control functions.

As specific control functions, the controller 200 includes a communication control function for connecting the mobile station UE wirelessly connected to the remote unit RUn to the 5G core network 5GC via the master unit MU and the base station apparatus gNB2. In addition, the controller 200 includes at least a beam forming control function 200a, a search control function 200b, and a handover control function 200c, and also includes a processing function for integrating and executing these functions.

The beam forming control function 200a controls the massive MIMO by the radio communication unit 230, and performs beam forming according to a predetermined algorithm in accordance with the number of streams allocated to the mobile station UE, and the like.

FIG. 4 shows an example of beam forming. In this example, as shown in FIG. 4 (*a*), for example, the antenna ANn is divided into four groups Gr1 to Gr4 so that a large number of antenna elements correspond to four streams, and the directivity can be controlled in an arbitrary direction for each group.

In a case where one mobile station UE is located in the cover area of the antenna ANn and two streams are allocated to the mobile station UE, for example, as shown in FIG. 4 (*b*), beam forming is performed to direct the stream of the group Gr1 and the stream of the group Gr2 in the direction in which the mobile station UE is located.

In a case where one mobile station UE is located in the cover area of the antenna ANn and four streams are allocated to the mobile station UE, for example, as shown in FIG. 4 (*c*), beam forming is performed to direct the streams of the respective groups Gr1 to Gr4 in the direction in which the mobile station UE is located.

The search control function 200b controls the radio communication unit 230 to search for and estimate (detect) a direction and a range in which the mobile station UE is located. Specifically, the search control function 200b controls the massive MIMO by the radio communication unit 230 to repeatedly perform sweeping in the direction in which the beam is directed every 20 ms in an arbitrary range, for example, as shown in FIG. 5 (*a*), while monitoring the reception signal intensity sequentially detected by the radio communication unit 230, thereby detecting a direction and a range in which the mobile station UE is located. FIG. 5 (*b*) shows a timing of each of the beams shown in FIG. 5 (*a*), and the beams having the same shading in both figures represent the same beams.

The handover control function 200c is a control function for realizing a handover of the mobile station UE among the remote units RU1 to RU3 in cooperation with the master unit MU. To be more specific, the handover control function 200c notifies the master unit MU of the reception signal intensities sequentially detected by the radio communication unit 230, and in accordance with an instruction from the master unit MU (the handover control function), terminates the communication with the mobile station UE that is communicating at that time (for example, when moving in a direction out of the cover area), or newly starts communication with the mobile station UE (for example, when moving in a direction into the cover area).

The storage 240 stores a control program used by the controller 200 and a UE position information table 240a. The control program and the control data are installed in advance at the time of manufacturing, installed or updated through an external interface (not shown) at the time of process setting, or installed or updated by communicating with a server on the 5G core network 5GC, such as the core apparatus C.

The UE position information table 240a is a data table in which position information on the mobile station UE located in the cover area of the remote unit RUn is recorded, and items of information on the mobile station UE such as identification information, position information, and a date and time of updating are stored in association with each other. As an example of the position information, for example, a combination of identification information of the groups Gr1 to Gr4 of the antenna elements, azimuth information in which the beams are directed, information of the estimated distances, and the like is considered, but is not limited to this example.

Next, an operation will be described. In the following description, in particular, search control and stream allocation of the mobile station UE in the remote unit RUn of the distributed antenna system DAS will be described. FIG. 6 is a flowchart for explaining a control flow of the controller 200 of the remote unit RUn.

When the operation of the distributed antenna system DAS is started, in the remote unit RUn, the controller 200 executes several control flows in parallel, one of which is the control flow shown in FIG. 6. The control flow shown in FIG. 6 is repeatedly executed until the operation of the remote unit RUn is stopped or a stop command is received from the master unit MU or the like.

First, in step 601, the controller 200 starts or restarts a timer T, sets a value indicating OFF as a parameter of a time-out flag F stored in the work memory, and proceeds to step 602. That is, the controller 200 starts or restarts a time count by the timer T from the time point when the process proceeds to step 601.

In step 602, the controller 200 determines whether or not a new stream has been allocated to the mobile station UE from the master unit MU. Here, the new stream means a stream for newly performing communication in response to a request from the master unit MU. If a new stream has been allocated, the process proceeds to step 606, and if a new stream has not been allocated, the process proceeds to step 603.

In Step 603, the controller 200 determines whether or not a new communication start request has been generated from the mobile station UE. Here, the new communication start request means a request for newly performing communication in response to a request from the mobile station UE. If a new communication start request has been generated, the process proceeds to step 606, and if a new communication start request has not been generated, the process proceeds to step 604.

In step 604, the controller 200 checks the timer T started in step 601, and determines whether or not a preset time t has elapsed from step 601. If the time t has elapsed, the process proceeds to step 605, and on the other hand, if the time t has not elapsed, the process proceeds to step 602 again.

In step 605, the controller 200 sets a value indicating ON as the parameter of the time-out flag F described above, and proceeds to step 607. With this setting (ON setting), the time-out flag F indicates that the processing of the subsequent steps 607 to 609 is executed in response to the time-out in step 604.

In step 606, the controller 200 refers to the UE position information table 240*a* stored in the storage 240, compares the date and time of updating included in the table with the current time, and determines whether or not the preset time has elapsed.

If there is no information in the UE position information table 240*a* or if the preset time has elapsed, the process proceeds to step 607. On the other hand, if the preset time has not elapsed, the process proceeds to step 611.

That is, if there is no position information of the mobile station UE in the UE position information table 240*a* or if the position information is old, it is determined that a search for the mobile station UE is necessary, and the process proceeds to step 607 to search for the mobile station UE. On the other hand, if the position information of the mobile station UE that can be referred to is present in the UE position information table 240*a*, the process proceeds to step 611, and stream allocation is performed.

In step 607, the controller 200 uses the search control function 200*b* to perform a high-speed search for detecting a direction in which the mobile station UE is located, and proceeds to step 608.

Specifically, the controller 200 controls the massive MIMO by the radio communication unit 230 to set a variable range of a direction in which the beam is directed (for example, in the horizontal direction) to about 120 degrees as shown in FIG. 7 (*a*), repeatedly performs sweeping every 20 ms as shown in FIG. 7 (*b*), while monitoring the reception signal intensity sequentially detected by the radio communication unit 230, thereby detecting identification information of the mobile station UE and a direction and a range in which the mobile station UE is located. FIG. 7 (*b*) shows a reception signal intensity corresponding to each of the beams shown in FIG. 7 (*a*), and the beams having the same shading in both figures represent the same beams.

The high-speed search is independently performed for each of the four groups Gr1 to Gr4 of the antenna elements on the antenna ANn. The azimuth to be searched by each of the groups Gr1 to Gr4 may be arbitrarily set by an operator at the time of process setting, may be set by the search control function 200*b* on the basis of statistical data or learning data of the position information of the mobile station UE cumulatively stored in the storage 240, or may be updated by reviewing the setting.

In step 608, the controller 200 uses the search control function 200*b* to perform a low-speed search for detecting a direction in which the mobile station UE is located, and proceeds to step 609.

Figure 8:
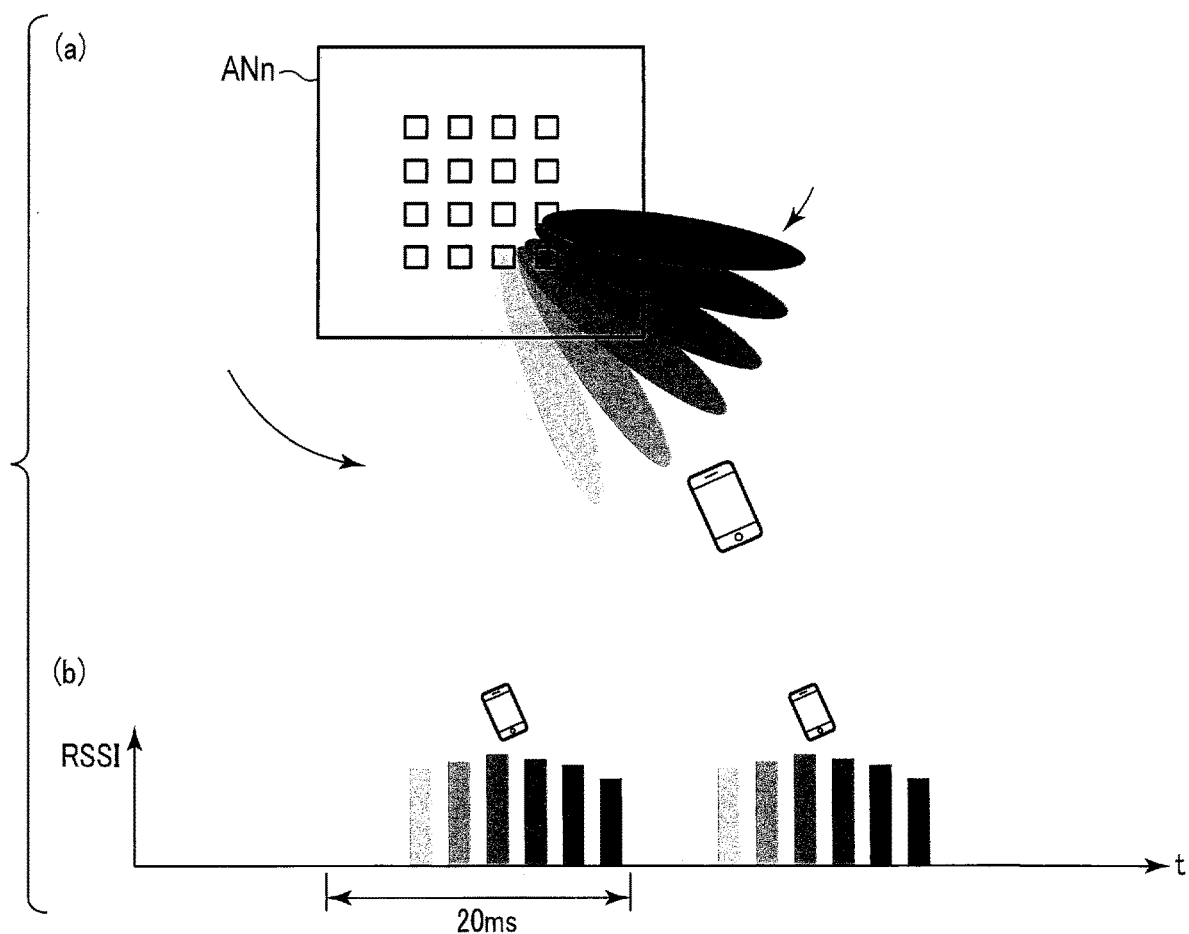
FIG. 8 is a diagram showing an example of a low-speed search for the mobile station by a remote unit shown in FIG. 1.

Specifically, the controller 200 controls the massive MIMO by the radio communication unit 230 to set a variable range of a beam pointing direction (for example, in the horizontal direction) to about 90 degrees, which is smaller than 120 degrees in the high-speed search, as shown in FIG. 8 (*a*), and repeatedly performs sweeping every 20 ms as shown in FIG. 8 (*b*). During this time, the controller 200 monitors the reception signal intensity sequentially detected by the radio communication unit 230 at the same frequency as the high-speed search, thereby detecting identification information of the mobile station UE and a direction and a range in which the mobile station UE is located. Similarly to FIG. 7, FIG. 8 (*b*) shows a reception signal intensity corresponding to each of the beams shown in FIG. 8 (*a*), and the beams having the same shading in both figures represent the same beams.

The low-speed search is independently performed for each of the four groups Gr1 to Gr4 of the antenna elements on the antenna ANn. The azimuth searched by each of the groups Gr1 to Gr4 has a center in a central portion of the direction detected by the high-speed search in step 607. The range of the search direction may be limited by an operator at the time of process setting, or may be limited by the search control function 200*b* on the basis of statistical data or learning data of the position information of the mobile station UE cumulatively stored in the storage 240, or the limited range may be reviewed.

At a time when the process proceeds to step 608, the parameter of the time-out flag F stored in the work memory may be referred to. If a value indicating ON is set at that time, the low-speed search in step 608 may be skipped and the process may proceed to step 609. That is, if a time-out occurs, the search with a higher accuracy may be omitted.

In step 609, the controller 200 stores the identification information of the mobile station UE detected in step 608, the information (position information) of the direction and a range in which the mobile station UE is located, and the time at the time of detection (date and time of update) in the UE position information table 240*a* in association with each other, and the process proceeds to step 610. Here, if information of the same mobile station is present in the UE position information table 240*a*, the information may be overwritten and stored, or information for a certain period (a certain number of times) may be cumulatively stored as a log. This log can be used by the controller 200 as the learning data described above.

In step 610, the controller 200 refers to the parameter of the time-out flag F stored in the work memory, and determines whether or not a value indicating ON is set. If a value indicating ON is set, the process proceeds to step 601, and if a value indicating OFF is set, the process proceeds to step 611.

That is, if a value indicating ON is set, only the updating of the information of the UE position information table 240*a* is performed, and on the other hand, if a value indicating OFF is set, the process proceeds to a subsequent stream allocation process.

In step 611, the controller 200 allocates a stream to the mobile station UE, and proceeds to step 612. Specifically, if it is determined that a new stream is allocated by the master unit MU in step 602, the controller 200 allocates the ID of the stream notified from the master unit MU to the mobile station UE, and on the other hand, if a new communication start request is generated from the mobile station UE in step 603, an ID of an available stream is allocated to the mobile station UE. It is assumed that the controller 200 is periodically notified of the ID of an available stream in advance from the master unit MU.

In step 612, the controller 200 uses the beam forming control function 200*a* to control the massive MIMO by the radio communication unit 230 for the stream allocated to the mobile station UE in step 611, performs beam forming according to a predetermined algorithm, and proceeds to step 613.

To be more specific, the controller 200 refers to the UE position information table 240*a*, and forms a beam directed in the direction in which the mobile station UE is located based on the identification information of the mobile station UE to which the stream is allocated in step 611 and the position information associated with the identification information.

In step 613, the controller 200 controls the radio communication unit 230 to establish a radio communication link with the mobile station UE to which the stream is allocated in step 611. The controller 200 also controls the signal processor 220 to establish a communication link for the mobile station UE with the core apparatus C, connects the mobile station UE to the core apparatus C through these links, and proceeds to step 614. Thereafter, communication via the stream allocated in step 611 is started between the mobile station UE and the core apparatus C.

In step 614, in order to maintain the radio communication link established in step 613, the controller 200 uses the search control function 200b to perform a low-speed search for tracking the direction in which the mobile station UE is located, and proceeds to step 615.

Specifically, the controller 200 controls the massive MIMO by the radio communication unit 230 to set a variable range of a direction in which the beam is directed (for example, in the horizontal direction) to a trackable range (about 45 degrees in the example of FIG. 9 (a)), which is smaller than about 90 degrees in the low-speed search in step 608, as shown in FIG. 9 (a).

Then, as shown in FIG. 9 (b), the controller 200 repeatedly performs sweeping every 20 ms. During this time, the controller 200 monitors the reception signal intensity sequentially detected by the radio communication unit 230, thereby detecting identification information of the mobile station UE and a direction in which the mobile station UE is located. Similarly to FIG. 8, FIG. 9 (b) shows a reception signal intensity corresponding to each of the beams shown in FIG. 9 (a), and the beams having the same shading in both FIG. 9 (a) and FIG. 9 (b) represent the same beams.

The variable range may be varied based on data learned by the controller 200 about the movement of the mobile station UE. In addition, the controller 200 may estimate the distance between the remote unit RUn and the mobile station UE from the reception signal intensity and may vary the variable range. In this case, if the reception signal intensity is relatively high, the controller 200 determines that the distance between the remote unit RUn and the mobile station UE is short, and widens the variable range. On the other hand, if the reception signal intensity is relatively low, the controller 200 determines that the distance between the remote unit RUn and the mobile station UE is long, and narrows the variable range.

In step 615, the controller 200 uses the beam forming control function 200a to perform beam forming for forming a beam directed in the direction detected in step 614, maintains the radio communication link established in step 613, and proceeds to step 616.

In step 614, the controller 200 may estimate the moving direction of the mobile station UE, and in step 615, the controller 200 may perform beam forming to form a beam directed in a direction based on the estimation result in step 614. For example, when the mobile station UE moves as shown in FIG. 10 (a), the controller 200 can estimate the moving direction of the mobile station UE from the reception signal intensities of the respective beams, the magnitude relation between the reception signal intensities in the respective directions, the change thereof, and the like.

In step 616, the controller 200 determines whether or not the communication started at step 613 has terminated. If the communication has terminated, the process is newly started from step 601. If the communication has not terminated, the process proceeds to step 614, and the beam forming is continuously performed to maintain the radio communication link.

As described above, in the communication relay system having the aforementioned configuration, the direction in which the beam is directed is varied for each of the remote units RU1 to RU3, and the direction and the range in which the mobile station UE is located are detected based on the signal intensities received from the mobile station UE.

Therefore, according to the communication relay system having the aforementioned configuration, each of the remote units RU1 to RU3 can detect the position of the mobile station UE located in the cover area.

In the communication relay system having the aforementioned configuration, each of the remote units RU1 to RU3 continuously performs a high-speed search for detecting the position of the mobile station UE by directing a beam in a wide range of directions and a low-speed search for detecting the position of the mobile station UE with a higher accuracy by directing a beam in a range of directions narrower than that in the high-speed search.

Therefore, according to the communication relay system having the aforementioned configuration, each of the remote units RU1 to RU3 can efficiently detect the position of the mobile station UE located in the cover area.

Furthermore, in the communication relay system having the aforementioned configuration, the remote units RU1 to RU3 vary the direction in which the beam is directed to track the mobile station UE.

Therefore, according to the communication relay system having the aforementioned configuration, each of the remote units RU1 to RU3 can perform stable communication with the mobile station UE located in the cover area, and can perform high-quality communication.

In addition, according to the communication relay system having the aforementioned configuration, in the remote units RU1 to RU3, the antenna elements on the antennas AN1 to AN3 included in the respective remote units are divided into four groups Gr1 to Gr4 to track the mobile station UE by independently varying the direction in which the beam is directed for each of the groups Gr1 to Gr4.

Therefore, according to the communication relay system having the aforementioned configuration, for example, even if a plurality of mobile stations UE1 and UE2 are located in substantially the same azimuth with respect to the antenna ANn as shown in FIG. 11 (a), the two groups Gr1 and Gr2 can search for the respectively set directions.

FIG. 11 (b) and FIG. 11 (c) show a reception signal intensity corresponding to each of the beams shown in FIG. 11 (a), and the beams having the same shading in both figures represent the same beams.

In this case, since the two groups Gr1 and Gr2 are controlled independently of each other by the controller 200, for example, as shown in FIG. 12 (a), when the group Gr1 is performing a low-speed search for tracking the mobile station UE1 in step 614 of FIG. 6, the group Gr2 can perform a high-speed search for the mobile station UE2 in step 607 of FIG. 6.

FIG. 12 (b) and FIG. 12 (c) show a reception signal intensity corresponding to each of the beams shown in FIG. 12 (a), and the beams having the same shading in both figures represent the same beams.

The present invention is not limited to the embodiment described above and can be embodied in practice by modifying the structural elements without departing from the gist of the invention. In addition, various inventions can be made by suitably combining the structural elements disclosed in connection with the above embodiments. Furthermore, for example, a configuration may be considered in which some structural elements of all the structural elements described in the embodiment are deleted. Furthermore, structural elements of different embodiments may be suitably combined.

For example, in the above embodiment, in order to simplify the description, the case in which one group of antenna elements searches for one mobile station UE has been described as an example; however, one antenna group may search for two or more mobile stations.

Specifically, for example, as shown in FIG. 13, the group Gr1 on the antenna ANn searches for two mobile stations UE1 and UE2. In this case, as shown in FIG. 13 (b), since two peaks of the reception signal intensities appear, the controller 200 can detect the number of mobile stations and their directions by detecting the peaks of the reception signal intensities.

FIG. 13 (b) shows a reception signal intensity corresponding to each of the beams shown in FIG. 13 (a), and the beams having the same shading in both figures represent the same beams.

Further, for example, in the embodiment described above, in the high-speed search in step 607, the low-speed search in step 608, and the low-speed search in step 614, as shown in FIGS. 7, 8, and 9, the case in which the range of the direction in which the beam is directed is controlled for the same antenna group has been described as an example; however, the present embodiment is not limited thereto.

For example, different antenna groups may be used for some or all of the high-speed search in step 607, the low-speed search in step 608, and the low-speed search in step 614. That is, for example, the group Gr1 is used in the high-speed search of step 607 and the low-speed search of step 608, and the group Gr2 is used in the low-speed search of step 614. Alternatively, the group Gr1 is used in the high-speed search of step 607, and the group Gr2 is used in the low-speed search of step 614 and the low-speed search of step 608. Alternatively, the group Gr1 is used in the high-speed search of step 607 and the low-speed search of step 614, and the group Gr2 is used in the low-speed search of step 608. Alternatively, the group Gr1 is used in the high-speed search of step 607, the group Gr2 is used in the low-speed search of step 608, and the group Gr3 is used in the low-speed search of step 614.

It is needless to say that various modifications can be made without departing from the scope of the present invention.

While several embodiments have been described, these embodiments have been presented by way of example and are not intended to limit the scope of the invention. The novel embodiments described herein can be implemented in a variety of other forms; furthermore, various omissions, substitutions, and changes can be made without departing from the spirit of the invention. The embodiments and their modifications are included in the scope and spirit of the invention and are included in the scope of the claimed inventions and their equivalents.

What is claimed is:

1. A communication relay apparatus for relaying communication between a base station connected to a network and a mobile station, the communication relay apparatus comprising:
   an antenna including a large number of antenna elements and configured to have a directivity that is controlled by signal phase adjustment through the antenna elements, and form a beam of radio waves in an arbitrary direction;
   a signal intensity detector configured to detect an intensity of a signal received by the antenna; and
   a controller configured to sweep a direction of the beam, the beam being formed by the antenna, within a first range by signal phase adjustment via some of the large number of antenna elements included in the antenna, and to detect a direction of the mobile station in which the mobile station is located based on the intensity of the signal detected by the signal intensity detector,
   wherein the controller is further configured to sweep the direction of the beam, the beam being formed by the antenna within a second range, the second range including the direction of the mobile station detected by the controller within the first range and being narrower than the first range, by signal phase adjustment via some of the large number of antenna elements included in the antenna, and to detect a direction of the mobile station in which the mobile station is located based on the intensity of the signal detected by the signal intensity detector.

2. The communication relay apparatus according to claim 1, wherein the controller is configured to sweep the direction of the beam formed by the antenna within the first range, and to detect a direction in which the mobile station is located based on the change in the intensity of the signal detected by the signal intensity detector, a direction in which a radio signal having a peak in the change in the intensity of the signal is received being detected as the direction in which the mobile station is located.

3. The communication relay apparatus according to claim 1, wherein the controller is configured to sweep the direction of the beam formed by the antenna within a third range equal to or smaller than the second range, to receive a radio signal transmitted from the mobile station, and to detect movement of the mobile station based on the intensity of the signal detected by the signal intensity detector.

4. A storage medium storing a computer program that causes a computer used in a communication relay apparatus for relaying communication between a base station connected to a network and a mobile station to function as:
   a signal intensity detector configured to detect an intensity of a signal received by an antenna that includes a large number of antenna elements and is configured to have a directivity that is controlled by signal phase adjustment through the antenna elements, and form a beam of radio waves in an arbitrary direction; and
   a controller configured to sweep a direction of the beam, the beam being formed by the antenna, within a first range by signal phase adjustment via some of the large number of antenna elements included in the antenna, and to detect a direction of the mobile station in which the mobile station is located based on the intensity of the signal detected by the signal intensity detector,
   wherein the controller is further configured to sweep the direction of the beam, the beam being formed by the antenna, within a second range, the second range including the direction of the mobile station detected by the controller within the first range and being narrower than the first range, by signal phase adjustment via some of the large number of antenna elements included in the antenna and to detect a direction in which the mobile station is located based on the intensity of the signal detected by the signal intensity detector.

* * * * *